United States Patent
Nguyen et al.

(10) Patent No.: US 11,236,595 B2
(45) Date of Patent: Feb. 1, 2022

(54) ADDITIVES FOR STEAM-INJECTION OIL RECOVERY

(71) Applicant: ChampionX USA Inc., Sugar Land, TX (US)

(72) Inventors: Duy T. Nguyen, Richmond, TX (US); David Francis Myers, Angleton, TX (US); Tyler D. Boyd, Houston, TX (US)

(73) Assignee: ChampionX USA Inc., Sugar Land, TX (US)

( * ) Notice: Subject to any disclaimer, the term of this patent is extended or adjusted under 35 U.S.C. 154(b) by 16 days.

(21) Appl. No.: 16/655,683

(22) Filed: Oct. 17, 2019

(65) Prior Publication Data

US 2020/0131895 A1 Apr. 30, 2020

Related U.S. Application Data

(60) Provisional application No. 62/751,013, filed on Oct. 26, 2018.

(51) Int. Cl.
*E21B 43/241* (2006.01)
*C09K 8/592* (2006.01)
*C10G 1/04* (2006.01)

(52) U.S. Cl.
CPC ............ *E21B 43/241* (2013.01); *C09K 8/592* (2013.01); *C10G 1/047* (2013.01)

(58) Field of Classification Search
CPC .... E21B 43/24; E21B 43/241; E21B 43/2406; E21B 43/2408; C09K 8/58; C09K 8/584; C09K 8/592; C09K 8/594; C10G 1/047
See application file for complete search history.

(56) References Cited

U.S. PATENT DOCUMENTS 3,732,926 A 5/1973 Brown et al.
4,458,759 A 7/1984 Isaacs et al.
(Continued)

FOREIGN PATENT DOCUMENTS

CA 2886934 A1 9/2015
CA 2958449 A1 8/2017
(Continued)

OTHER PUBLICATIONS

International Search Report received in Application No. PCT/US2019/056696, dated Jan. 8, 2020, 5 pages.
(Continued)

*Primary Examiner* — Angela M DiTrani Leff
(74) *Attorney, Agent, or Firm* — Kagan Binder, PLLC

(57) ABSTRACT

Ether amine additives are used in oil recovery such as steam-assisted gravity drainage and cyclic steam stimulation, as well as surface mining of bitumen. Methods of oil recovery using the ether amine additives are described. The ether amine additives are injected with steam into a subterranean oil reservoir such as oil tar sands to improve recovery of oils such as bitumen and/or heavy oil, or used to wash surface-mined rock to assist in oil extraction therefrom. The ether amine additives may be added to steam in steam-assisted oil recovery methods such as cyclic steam stimulation and steam-assisted gravity drainage. Condensates of the additives in steam exhibit very low advancing and receding contact angles and low interfacial tensions at low concentrations of the additives.

16 Claims, 1 Drawing Sheet

(56) References Cited

U.S. PATENT DOCUMENTS

| | | | |
|---|---|---|---|
| 4,975,208 | A | 12/1990 | Watkins |
| 6,169,064 | B1 | 1/2001 | Krogh et al. |
| 6,230,814 | B1 | 5/2001 | Nasr et al. |
| 6,403,834 | B1 | 6/2002 | Alas et al. |
| 8,389,448 | B1 | 3/2013 | Berger et al. |
| 9,150,776 | B2 | 10/2015 | Cross |
| 9,382,192 | B2 | 7/2016 | Elowe et al. |
| 9,644,467 | B2 | 5/2017 | Chakrabarty |
| 9,739,124 | B2 | 8/2017 | Akiya et al. |
| 9,790,431 | B2 | 10/2017 | Akiya et al. |
| 9,845,669 | B2 | 12/2017 | Miller et al. |
| 9,879,512 | B2 | 1/2018 | Cross et al. |
| 10,125,591 | B2 | 11/2018 | Okuno |
| 10,138,719 | B2 | 11/2018 | Akiya et al. |
| 10,400,564 | B2 | 9/2019 | Singh et al. |
| 2009/0218099 | A1* | 9/2009 | Hart ............... E21B 43/2408 166/303 |
| 2009/0247429 | A1* | 10/2009 | Miller ............... C09K 8/22 507/130 |
| 2011/0272151 | A1 | 11/2011 | Matzakos |
| 2013/0081808 | A1 | 4/2013 | Zeidani et al. |
| 2015/0307787 | A1* | 10/2015 | Akiya ............... C10G 1/04 208/390 |
| 2016/0160115 | A1 | 6/2016 | Gamage et al. |
| 2016/0200961 | A1 | 7/2016 | McDaniel et al. |
| 2017/0241250 | A1* | 8/2017 | Singh ............... E21B 43/2408 |
| 2018/0038211 | A1 | 2/2018 | Okuno |
| 2018/0208875 | A1 | 7/2018 | Man et al. |
| 2019/0119577 | A1 | 4/2019 | Witham et al. |
| 2019/0225889 | A1 | 7/2019 | Tulchinsky et al. |
| 2019/0322944 | A1 | 10/2019 | Witham et al. |

FOREIGN PATENT DOCUMENTS

| | | |
|---|---|---|
| WO | 2009/108423 A1 | 9/2009 |
| WO | 2014099466 A1 | 6/2014 |
| WO | 2015061903 A1 | 5/2015 |
| WO | 2018017221 A1 | 1/2018 |
| WO | 2018111342 A1 | 6/2018 |
| WO | 2020/006412 A1 | 1/2020 |
| WO | 2020/006422 A1 | 1/2020 |

OTHER PUBLICATIONS

Written Opinion received in Application No. PCT/US2019/056696, dated Jan. 8, 2020, 7 pages.

Bera et al., "Microemulsions: a novel approach to enhanced oil recovery: a review", Journal of Petroleum Exploration and Production Technology, vol. 5, Issue 3, (Sep. 2015) pp. 255-268.

Temple-heald et al., "The development and field application of new surfactant chemistries for application to heavy oils", SPE International Symposium on Oilfield Chemistry, vol. 2, Society of Petroleum Engineers (2013) pp. 769-778.

Thomas et al., "Chemical methods for heavy oil recovery", Journal of Canadian Petroleum Technology, vol. 40, No. 3, (Mar. 2001) pp. 56-61.

* cited by examiner

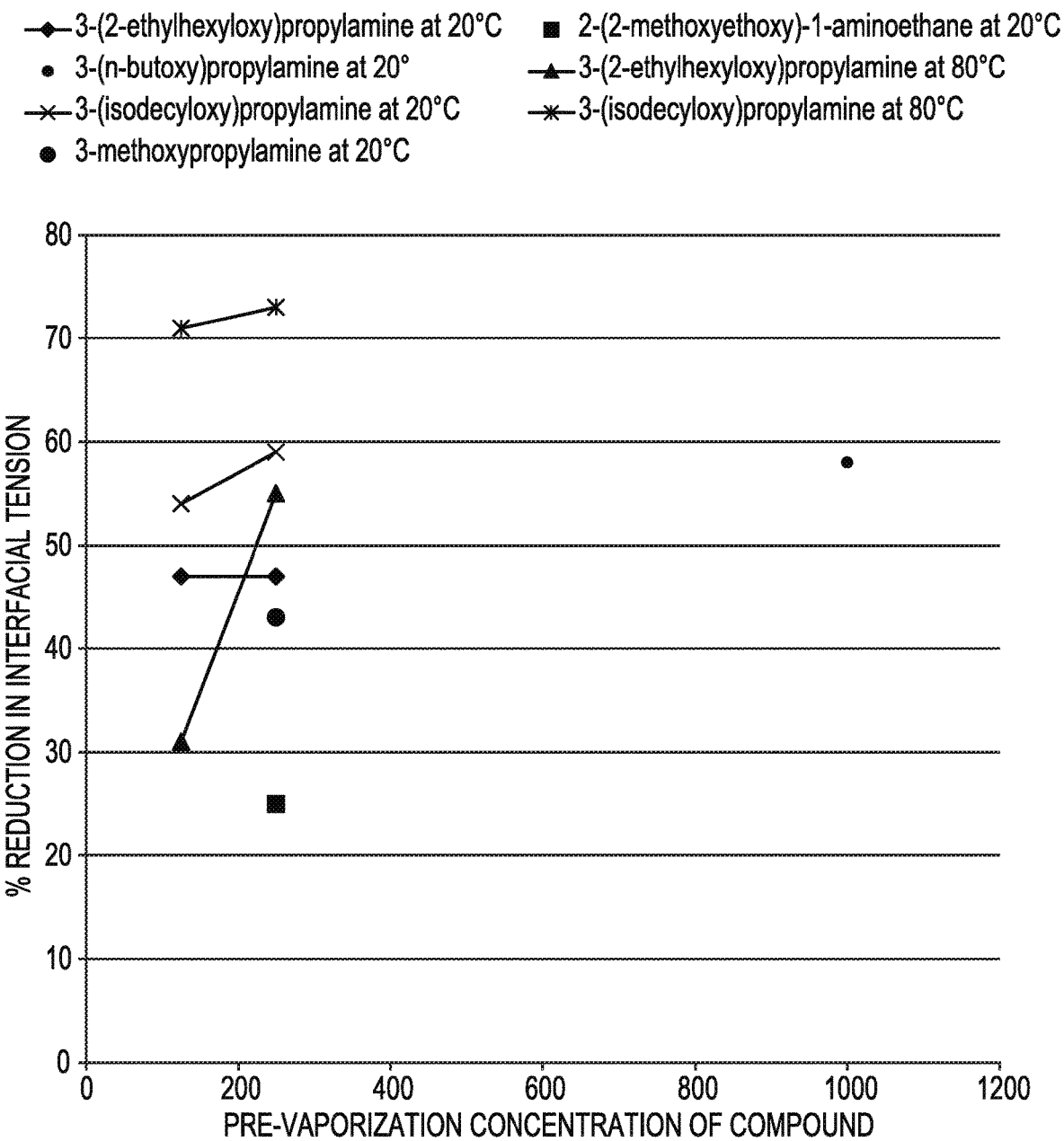

ADDITIVES FOR STEAM-INJECTION OIL RECOVERY

CROSS-REFERENCE TO RELATED APPLICATION

This application claims priority to U.S. Provisional Patent Application No. 62/751,013, filed Oct. 26, 2018, entitled "ADDITIVES FOR STEAM-INJECTION OIL RECOVERY," of which is incorporated by reference herein, in the entirety and for all purposes.

TECHNICAL FIELD

The present invention relates to methods for improved steam-assisted oil recovery of heavy crude oil and/or bitumen. The method includes injecting a vapor composition comprising one or more ether amines into a subterranean oil reservoir such as an oil tar sands reservoir.

BACKGROUND

Oil sands, also known as tar sands or more technically bituminous sands, are a type of uncodnventional petroleum deposit. Oil sands are either loose sands or partially consolidated sandstone containing a naturally occurring mixture of sand, clay, and water, saturated with a dense and extremely viscous form of petroleum referred to as bitumen. Such natural bitumen deposits are found in many countries, and large reserves thereof are located in Canada, Kazakhstan, Venezuela, and Russia.

Oil produced from oil sands is often referred to as unconventional oil or crude bitumen, to distinguish it from liquid hydrocarbons produced from traditional oil wells. The crude bitumen contained in the Canadian oil sands is a highly viscous mixture of hydrocarbons heavier than pentanes which, in its natural state, is not usually recoverable at a commercial rate through a regular oil well because it is too thick to flow unless heated or diluted with lighter hydrocarbons such as light crude oil or natural-gas condensate.

Much new production of bitumen and/or heavy oil comes from Alberta's vast oil sands deposits. Two types of oil recovery from oil sands are strip mining and steam injection methods. Strip mining is generally only suitable for recovery of bitumen from shallow deposits. However, steam injection methods such as steam-assisted gravity drainage (SAGD) and cyclic steam stimulation (CSS) are better suited for oil recovery of bitumen and/or heavy oil from the much larger deep deposits thereof that surround the shallow deposits. As a result, steam injection methods of oil recovery have become important recovery techniques for highly viscous crude oils such as heavy crude oil and bitumen.

Steam injection methods of oil recovery involve the injection of superheated steam into a subterranean oil formation containing highly viscous crude oil materials, i.e. oils that are highly viscous at the formation temperature. The injection of the steam raises the temperature of the crude oil in the formation, thereby lowering the viscosity of the oil and enabling the flow and recovery thereof.

The steam-assisted gravity drainage process is commonly used in oil sands deposits such as those found in central Canada. It is an advanced form of steam stimulation in which a pair of substantially horizontal wells is drilled into an oil formation, one a few meters above the other. High pressure steam is continuously injected into a first (upper) wellbore to heat the oil and reduce its viscosity. A volume of elevated temperature called a "steam chamber" is formed around the upper wellbore, the volume extending outwards into the formation. Oil thus heated has a lowered viscosity and drains under gravity into a second (lower) wellbore. A mixture of oil and a produced water comprising an emulsion is pumped out from the lower wellbore. This can be an emulsion comprising about 75% water and about 25% heavy oil and/or bitumen. The emulsion is separated into a crude oil and a produced water. The oil is transported off-site for refining.

A further steam-assisted oil-recovery technique for recovering highly viscous crude oils is cyclic steam stimulation (CSS), which is also known as "huff and puff". In CSS, steam is injected into a single wellbore, thereby heating the formation and decreasing the viscosity of the oil therein. The process is cyclic, each cycle comprising three stages: the first stage is the "huff" (or injection) phase, in which steam is injected into the formation for a period of days to weeks. The second stage of several days is the "soak" phase (or shut-in phase), in which steam injection is discontinued and heat allowed to dissipate within the formation. The third stage is the "puff" phase, a production (or recovery) phase lasting weeks to months, in which produced fluids are pumped from the well.

Although the steam injection methods for oil recovery are highly advantageous, there are also drawbacks. Steam-injection processes rely on energy-intensive production of steam to assist with bitumen recovery and therefore require significant quantities of water and energy for steam generation. For example, approximately three gallons of water may be required per gallon of oil produced. This is not only water-intensive but also energy-intensive, as the water must be converted to steam. Further, significant quantities of water are produced, which require water-recycling and/or other means of disposition.

It would therefore be highly advantageous if oil recovery could be improved in steam-assisted oil recovery methods, thereby increasing the amount of oil recovered per unit of water used.

Seeking out additives that could increase the amount of bitumen produced for the same steam input is highly desirable. Such additives would advantageously, for example, lower interfacial tension and/or contact angle between water and oil within the oil formation, be volatile enough to be carried with the steam through a sand pack to reach the bitumen and/or heavy oil deposits without being absorbed by the sand pack, and lower the input steam to produced oil ratio. However, such additives can be expensive, may be left in the formation, and may contribute to formation of emulsions between the bitumen and produced water that must be broken to maximize recovery of the bitumen. Therefore, it would be highly advantageous to provide additives having the aforementioned desirable and advantageous properties at the lowest concentrations of the additives to the steam possible.

SUMMARY

Disclosed herein are improved methods of enhanced oil recovery and additives therefor. One or more additives may be added to steam in steam-assisted oil recovery methods resulting in vapor compositions that comprise the additive and steam. The one or more additives may also be added to water, and the resulting water-additive mixture vaporized to provide a vapor composition comprising the additive and steam. Formation of the vapor composition is followed by injection of the vapor composition into a subterranean reservoir including heavy oil and/or bitumen.

The vapor compositions may condense during and/or after injection to form aqueous condensates. Vapor compositions derived from water-additive mixtures comprising, consisting essentially of, or consisting of water and 125 ppm to 250 ppm of one or more additives condense to form aqueous condensates having a lower oil/water dynamic interfacial tension than water alone. For example, condensates having or adjusted to have a pH from 6.5 to 7.5 have a dynamic interfacial tension (measured at 20° C.) with a bitumen droplet after one hour of contact between the droplet and the condensate of 40% to 75% less than corresponding interfacial tensions of water alone. The condensates exhibit low advancing contact angles with bitumen, low receding contact angles with bitumen, or both low advancing and low receding contact angles when compared with water alone or a condensate from an aqueous urea solution. For example, the condensates exhibit an advancing contact angle with bitumen measured by the Wilhelmy Plate Method of between 80° and 85° compared with 105° to 115° for deionized water with bitumen and 105° to 115° for condensates formed from 1000 ppm urea in water with bitumen; and a receding contact angle of 1° to 7° compared with 55° to 60° for deionized water and condensates of 1000 ppm of urea in water.

There is provided a method of steam-assisted oil recovery of first embodiments comprising, consisting of, or consisting essentially of (1) injecting a vapor composition into a subterranean oil reservoir, the vapor composition comprising, consisting of, or consisting essentially of one or more ether amine compounds having the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl; and recovering a recovery material, the recovery material comprising heavy crude oil, bitumen, or a combination thereof. In embodiments, the method is a cyclic steam stimulation method or in embodiments the method is a steam-assisted gravity drainage method. In embodiments, R is selected from the group consisting of n-butyl, 2-ethylhexyl, and isodecyl.

There is provided a method of steam-assisted oil recovery of second embodiments comprising, consisting of, or consisting essentially of (1) injecting a vapor composition into a subterranean oil reservoir, the vapor composition comprising, consisting of, or consisting essentially of steam and one or more ether amine compounds having the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl; and recovering a recovery material, the recovery material comprising heavy crude oil, bitumen, or a combination thereof. In embodiments, the method is a cyclic steam stimulation method or in embodiments the method is a steam-assisted gravity drainage method. In embodiments, R is selected from the group consisting of n-butyl, 2-ethylhexyl, and isodecyl.

In embodiments, the vapor composition of the second embodiments comprises 100 to 300 parts per million by weight of the one or more ether amines.

In embodiments, the temperature of the vapor composition of the first or second embodiments is about 160° C. to about 375° C.

In embodiments, the pressure of the vapor composition of the first or second embodiments is about 90 psi (621 kPa) to about 3,060 psi (21100 kPa).

In embodiments, the temperature of the vapor composition of the first or second embodiments is at a temperature of 200° C. to 350° C.

In embodiments, the vapor composition of the first or second embodiments is at a pressure of about 577 psi (3978 kPa) to about 799 psi (5509 kPa).

In embodiments, the subterranean oil reservoir is an oil sands reservoir.

In embodiments, the recovery material comprises bitumen, a heavy oil, a produced water, or any combination thereof.

In some second embodiments, the method is a steam-assisted gravity drainage method.

In some other embodiments, the method of the second embodiments is a cyclic steam stimulation method.

In some first or second embodiments, the vapor composition is injected via a first wellbore and the recovery material is recovered via a second wellbore.

In some first or second embodiments, the vapor composition is injected via a first wellbore and the recovery material is recovered via the first wellbore.

In embodiments, the temperature of the reservoir proximal to the first wellbore is about 200° C. to about 375° C.

In some first or second embodiments, the method further comprises injecting a steam composition into the subterranean oil reservoir, wherein the steam composition does not comprise an ether amine, wherein the steam composition comprises, consists of, or consists essentially of steam.

Herein is provided a use of one or more ether amine compounds as an additive to steam in a steam-assisted recovery of bitumen, heavy oil, or a combination thereof from a subterranean oil reservoir, wherein each of the one or more ether amine compounds has the formula R—O—$(CH_2)_3NH_2$, where R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

In some embodiments, R is selected from the group consisting of n-butyl, 2-ethylhexyl, and isotridecyl.

BRIEF DESCRIPTION OF THE DRAWING

The FIGURE is a plot of the percent reduction in interfacial tension versus pre-vaporization concentration of ether amine for various ether amine compounds.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "produced water" means any water obtained as a byproduct in any crude oil recovery process.

As used herein, the term "crude oil" refers to an unrefined petroleum product comprising hydrocarbon and having an American Petroleum Institute (API) gravity of between 10° and 50°.

As used herein, the term "heavy oil" or "heavy crude oil" means any crude petroleum with an American Petroleum Institute (API) gravity less than 22.3° and greater than 12°.

As used herein, "bitumen" means asphalt or a crude oil having an API gravity less than or equal to 12°.

As used herein, the term "vapor", unless specifically otherwise defined in context, refers indiscriminately to gas below or above the critical temperature.

As used herein, the term "steam" is used for water in the gas and/or vapor phase, irrespective of whether the water is above or below the critical temperature of 373.946° C.

Unless otherwise specified, all percent concentrations herein are by weight.

As used herein, "PSI" or "psi" refers to pounds per square inch, a unit of pressure.

As used herein, "ether amine" refers to a compound having an ether group and an amine group.

The terms "comprise(s)," "include(s)," "having," "has," "can," "contain(s)," and variants thereof, as used herein, are intended to be open-ended transitional phrases, terms, or words that do not necessarily but may preclude the possibility of additional acts or structures. The singular forms "a," "and," and "the" include plural references unless the context clearly dictates otherwise. The present disclosure also contemplates other embodiments "comprising," "consisting of," and "consisting essentially of," the embodiments or elements presented herein, whether explicitly set forth or not. Generally and as determined by context, the term "includes," as used in the specification, may be interpreted to mean any of "comprising," "consisting of," or "consisting essentially of."

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

We have found improved additives that may be injected into subterranean oil formations. The additives are steam-volatile, that is they vaporize in steam at a temperature of 160-260° C.

In embodiments, there is provided a method of steam-assisted oil recovery, the method comprising: (1) injecting a vapor composition into a subterranean oil formation; and (2) recovering a recovery material from the subterranean oil formation. The vapor composition comprises, consists of, or consists essentially of an ether amine compound having the formula R—O—$(CH_2)_3NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl. Injecting refers to the introduction of a composition of matter into a subterranean oil reservoir, for example via a pipe and/or pipe annulus.

In embodiments, the vapor composition comprises, consists of, or consists essentially of steam and an ether amine having the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, isododecyl, n-dodecyl, n-tridecyl, and isotridecyl.

In embodiments, the vapor composition is at a temperature of 160° C. to about 375° C. during injection.

In embodiments, there is provided a method of steam-assisted oil recovery, the method comprising: (1) injecting a vapor composition into a subterranean oil formation; and (2) recovering a recovery material from the subterranean oil formation, wherein the vapor composition comprises, consists of, or consists essentially of one or more ether amine compounds having a formula selected from the group consisting of $CH_3(CH_2)_3$—O—$(CH_2)_3$—$NH_2$, $CH_3(CH_2)_4$—O—$(CH_2)_3$—$NH_2$, $CH_3(CH_2)_5$—O—$(CH_2)_3$—$NH_2$, $CH_3(CH_2)_6$—O—$(CH_2)_3$—$NH_2$, $CH_3$—$(CH_2)_3$—$CH(C_2H_5)$—$CH_2$—O—$(CH_2)_3$—$NH_2$, $CH_3$—$(CH_2)_7$—O—$(CH_2)_3$—$NH_2$, $CH_3(CH_2)_8$—O—$(CH_2)_3$—$NH_2$, $(CH_3)$—$(CH_2)_9$—O—$(CH_2)_3$—$NH_2$, $(CH_3)_2CH$—$(CH_2)_7$—O—$(CH_2)_3$—$NH_2$, $CH_3(CH_2)_{11}$—O—$(CH_2)_3$—$NH_2$, $(CH_3)_2CH$—$(CH_2)_9$—O—$(CH_2)_3$—$NH_2$, $CH_3$—$(CH_2)_{12}$—O—$(CH_2)_3$—$NH_2$, $(CH_3)_2CH$—$(CH_2)_{10}$—O—$(CH_2)_3$—$NH_2$, and any combination thereof. In embodiments, the vapor composition comprises, consists of, or consists essentially of steam and one or more ether amine compounds having a formula selected from the group consisting of $CH_3(CH_2)_3$—O—$(CH_2)_3$—$NH_2$, $CH_3$—$(CH_2)_3$—$CH(C_2H_5)$—

CH$_2$—O—(CH$_2$)$_3$—NH$_2$, (CH$_3$)$_2$CH—(CH$_2$)$_7$—O—(CH$_2$)$_3$—NH$_2$, and any combination thereof.

The method includes softening bitumen, heavy crude oil, or a combination thereof in at least a region of the subterranean reservoir by raising the temperature of the bitumen, heavy crude oil, or combination thereof in the region of the subterranean reservoir by the injection of steam. The method also includes allowing the vapor composition to diffuse and condense in the region.

Advantageously, ether amine compounds having the formula R—O—(CH$_2$)$_3$—NH$_2$ as disclosed herein can be made by the reaction of an alcohol and acrylonitrile, followed by hydrogenation. Such ether amine compounds can easily be made with controlled molecular weight, which we believe is important to the ability of the ether amine compounds to volatilize in steam. Further, acrylonitrile is a widely available bulk starting material used in the manufacture of polymers, rather than a specialty chemical.

For example, ether amine compounds of the invention can be made by the following reaction scheme:

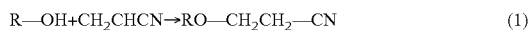

$$R\text{—}OH + CH_2CHCN \rightarrow RO\text{—}CH_2CH_2\text{—}CN \quad (1)$$

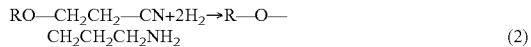

$$RO\text{—}CH_2CH_2\text{—}CN + 2H_2 \rightarrow R\text{—}O\text{—}CH_2CH_2CH_2NH_2 \quad (2)$$

wherein R— is selected from the group consisting of n-butyl, n-pentyl, n-hexyl, n-heptyl, 2-ethylhexyl, n-octyl, n-nonyl, n-decyl, isodecyl, isododecyl, n-dodecyl, n-tridecyl, and isotridecyl. Compounds made by this method include at least three carbon atoms between the ether group and the amine group, have a —CH$_2$-adjacent to the amine group, and are primary amines.

In embodiments, each of the one or more ether amine compounds has a boiling point at 1 atmosphere of pressure of about 40° C. to about 400° C., in embodiments about 50° C. to about 400° C., in embodiments about 50° C. to about 375° C., in embodiments about 50° C. to about 350° C., in embodiments about 50° C. to about 300° C., in embodiments about 50° C. to about 275° C., in embodiments about 50° C. to about 250° C., in embodiments about 50° C. to about 200° C., in embodiments, about 60° C. to about 250° C., in embodiments about 60° C. to about 200° C., in embodiments about 60° C. to about 180° C., or in embodiments about 70° C. to about 180° C.

In embodiments, the recovery material comprises, consists of, or consists essentially of bitumen, heavy crude oil, or a combination thereof In embodiments, the recovery material comprises, consists of, or consists essentially of bitumen and a produced water; heavy crude oil and a produced water; or bitumen, heavy crude oil, and a produced water.

In embodiments, the vapor composition injected into the subterranean formation is at a temperature of from about 150° C. to about 375° C., in embodiments about 150° C. to about 325° C., in embodiments about 150° C. to about 300° C., in embodiments from about 150° C. to about 290° C., in embodiments about 160° C. to about 280° C., in embodiments about 170° C. to about 270° C., in embodiments about 180° C. to about 260° C., in embodiments about 150° C. to about 310° C., in embodiments about 160° C. to about 300° C., in embodiments about 170° C. to about 350° C., in embodiments about 180° C. to about 325° C., or in embodiments about 190° C. to about 310° C.

In embodiments, the vapor composition is at a pressure of about 40 psi (275 kPa) to about 3,060 psi (21040 kPa), in embodiments about 60 psi (414 kPa) to about 3,060 psi (21040 kPa), in embodiments about 70 psi (483 kPa) to about 3,060 psi (21040 kPa), in embodiments about 70 psi (483 kPa) to about 2000 psi (13790 kPa), in embodiments about 70 psi (483 kPa) to about 1,450 psi (10000 kPa), in embodiments about 75 psi (520 kPa) to about 1,000 psi (6900 kPa), in embodiments about 90 (621 kPa) to about 680 psi (4688 kPa), in embodiments about 100 psi (690 kPa) to about 750 psi (5170 kPa), in embodiments about 150 psi (1034 kPa) to about 500 psi (3447 kPa), in embodiments about 175 psi (1210 kPa) to about 400 psi (2760 kPa), or in embodiments about 200 psi (1379 kPa) to about 350 psi (2413 kPa), or in embodiments about 319 psi (2200 kPa) to about 348 psi (2400 kPa).

In embodiments, the vapor composition comprises, consists of, or consists essentially of the one or more ether amine compounds and steam, wherein the total concentration of ether amine in the vapor composition is 10 ppm to 10,000 ppm, in embodiments 100 ppm to 10,000 ppm, in embodiments 100 ppm to 8,000 ppm, in embodiments 10 ppm to 8,000 ppm, in embodiments 100 ppm to 1,000 ppm, in embodiments 100 ppm to 250 ppm, in embodiments 150 ppm to 5,000 ppm, in embodiments 200 ppm to 1,000 ppm, in embodiments 10 ppm to 5,000 ppm, in embodiments 5 ppm to 1,000 ppm, in embodiments 10 ppm to 500 ppm by weight.

In embodiments, the method further comprises: (3) injecting a steam composition into a subterranean oil formation, the steam composition comprising steam, wherein the steam composition does not comprise an ether amine. In some such embodiments, the steam composition in step (3) comprises steam and an additive that is not an ether amine. In other such embodiments, the steam composition in step (3) consists of or consists essentially of steam. In such embodiments, steam is injected into a subterranean oil formation such as an oil sands formation, for example in a steam-assisted gravity drainage and/or cyclic steam stimulation method, wherein such steam does not comprise an ether amine additive. The one or more ether amine compounds is added to the steam for part of the time only (thereby providing separate steps (1) and (3)). Controlled quantities of an ether amine can be added to the formation by changing the concentration of ether amine injected with the steam in step (1), and/or by controlling the length of step (1).

In embodiments, the steam composition, the vapor composition, or the steam composition and the vapor composition injected into the subterranean formation are at a temperature of from about 150° C. to about 375° C., in embodiments about 150° C. to about 325° C., in embodiments about 150° C. to about 300° C., in embodiments from about 150° C. to about 290° C., in embodiments about 160° C. to about 280° C., in embodiments about 170° C. to about 270° C., in embodiments about 180° C. to about 260° C., in embodiments about 150° C. to about 310° C., in embodiments about 160° C. to about 300° C., in embodiments about 170° C. to about 350° C., in embodiments about 180° C. to about 325° C., or in embodiments about 190° C. to about 310° C.

In embodiments, the vapor composition is at a pressure of about 40 psi (275 kPa) to about 3,060 psi (21040 kPa), in embodiments about 60 psi (414 kPa) to about 3,060 psi (21040 kPa), in embodiments about 70 psi (483 kPa) to about 3,060 psi (21040 kPa), in embodiments about 70 psi (483 kPa) to about 2,000 psi (13790 kPa), in embodiments about 70 psi (483 kPa) to about 1,450 psi (10000 kPa), in embodiments about 75 psi (520 kPa) to about 1,000 psi (6900 kPa), in embodiments about 90 (621 kPa) to about 680 psi (4688 kPa), in embodiments about 100 psi (690 kPa) to about 750 psi (5170 kPa), in embodiments about 150 psi (1034 kPa) to about 500 psi (3447 kPa), in embodiments about 175 psi (1210 kPa) to about 400 psi (2760 kPa), in embodiments about 200 psi (1379 kPa) to about 350 psi (2413 kPa), in embodiments about 319 psi (2200 kPa) to about 348 psi (2400 kPa) or in embodiments about 203 psi (1400 kPa).

The one or more ether amine compounds can be added to steam in any steam-assisted oil recovery method for the recovery heavy crude oil and/or bitumen from a subterranean oil formation. For example, the one or more ether amine compounds can be included in steam injected in steam-assisted gravity drainage and/or cyclic steam stimulation processes.

In embodiments, the subterranean oil formation comprises heavy crude oil, bitumen, or a combination thereof. In embodiments, the recovery material comprises, consists of, or consists essentially of a produced water, heavy crude oil, bitumen, or any combination thereof.

In embodiments, any of the injections described herein comprises injecting via a first wellbore. In some such embodiments, recovering the recovery material comprises removing the recovery material from the subterranean formation via the first wellbore, for example in a cyclic steam stimulation oil-recovery method. In other such embodiments, recovering the recovery material comprises removing the recovery material from the subterranean formation via a second wellbore, for example in a steam-assisted gravity drainage oil-recovery method.

In embodiments, the temperature of the reservoir proximal to the first wellbore is about 180° C. to about 220° C., 200° C. to about 375° C., in embodiments about 200° C. to about 350° C., in embodiments about 200° C. to about 325° C., in embodiments about 200° C. to about 310° C., in embodiments about 200° C. to about 300° C., in embodiments about 200° C. to about 275° C., in embodiments about 200° C. to about 250° C., in embodiments about 200° C. to about 225° C., in embodiments about 225° C. to about 375° C., in embodiments about 225° C. to about 350° C., in embodiments about 225° C. to about 325° C., in embodiments about 225° C. to about 310° C., in embodiments about 225° C. to about 300° C., in embodiments about 240° C. to about 260° C., in embodiments 250° C. to about 350° C., in embodiments about 250° C. to about 325° C., in embodiments about 250° C. to about 310° C., in embodiments about 250° C. to about 300° C., in embodiments about 275° C. to about 350° C., in embodiments about 275° C. to about 325° C., in embodiments about 275° C. to about 310° C., or in embodiments about 275° C. to about 300° C. In this context, "proximal to" means a position at or within one meter of the wellbore.

In embodiments, the pressure of the subterranean reservoir proximal to the first wellbore is pressure of about 40 psi (275 kPa) to about 3,060 psi (21040 kPa), in embodiments about 60 psi (414 kPa) to about 3,060 psi (21040 kPa), in embodiments about 70 psi (483 kPa) to about 3,060 psi (21040 kPa), in embodiments about 70 psi (483 kPa) to about 2000 psi (13790 kPa), in embodiments about 70 psi (483 kPa) to about 1,450 psi (10000 kPa), in embodiments about 75 psi (520 kPa) to about 1,000 psi (6900 kPa), in embodiments about 90 (621 kPa) to about 680 psi (4688 kPa), in embodiments about 100 psi (690 kPa) to about 750 psi (5170 kPa), in embodiments about 150 psi (1034 kPa) to about 500 psi (3447 kPa), in embodiments about 175 psi (1210 kPa) to about 400 psi (2760 kPa), in embodiments about 200 psi (1379 kPa) to about 350 psi (2413 kPa), in embodiments about 319 psi (2200 kPa) to about 348 psi (2400 kPa) or in embodiments about 203 psi (1400 kPa). In this context, "proximal to" means a position at or within one meter of the wellbore.

In embodiments, the recovering comprises pumping the recovery material from the second wellbore. In some such embodiments, the pumping is effected by progressive cavity pump.

The recovery material comprises, consists of, or consists essentially of heavy crude oil, bitumen, or a combination thereof.

In embodiments, the recovery material comprises, consists of, or consists essentially of heavy crude oil and a produced water; bitumen and a produced water; or heavy crude oil, bitumen, and a produced water.

In some embodiments, the recovery material comprises bitumen and/or heavy crude oil and the subterranean oil formation comprises oil sands, the oil sands comprising heavy oil, bitumen, or a combination thereof; and sand, sandstone, clay, connate, or any combination thereof. In embodiments, the sand and/or sandstone comprises, consists of, or consists essentially of a quartz silica. In embodiments, the sandstone is not fully consolidated. In this context, "not fully consolidated" means that the sands have high porosity, little cohesion, and a very low tensile strength. Oil sands are sometimes saturated with oil which prevents them from fully consolidating into hard sandstone.

In steam-assisted gravity drainage, steam is injected continuously for an extended period of time that can be as long as the life of the well. The recovery material, oil and/or a produced water, is also collected for an extended period of time. There may be a delay period between the onset of the steam injection and the onset of recovery. Therefore, in embodiments the onset of the steam injection (step (1) and/or step (3) as described herein) is earlier than the onset of oil recovery by a delay period: in embodiments, the delay period is about 1 hour to about 60 days, in embodiments about 12 hours to about 30 days, in embodiments about 1 day to about 30 days, in embodiments about 1 day to about 14 days, in embodiments about 7 days to about 14 days, in embodiments about 1 day to about 7 days, or in embodiments about 10 minutes to about 12 hours.

The recovery may be intermittent, that is discontinuous, sporadic, and/or episodic. The vapor and/or steam injection may be started and stopped. The method can include more than one injection of the vapor composition comprising an ether amine and more than one injection of a steam composition not comprising an ether amine.

In some embodiments, e.g. in steam-assisted gravity drainage methods, the injection and the recovery of the recovery material are carried out contemporaneously. In other embodiments, e.g. in cyclic steam stimulation methods, the injection and recovery are not carried out contemporaneously.

In embodiments, the period of time of between injecting the vapor composition and/or steam composition and recovering the recovery material is from about one hour to about four weeks.

In embodiments of a cyclic steam stimulation method, the injecting of the vapor composition or the vapor composition and the steam composition is carried out for about 4 weeks to about 40 weeks, in embodiments about 4 weeks to about 30 weeks, in embodiments about 4 weeks to about 30 weeks, in embodiments about 4 weeks to about 25 weeks, in embodiments about 12 hours to about 40 weeks, in embodiments about 12 hours to about 30 weeks, in embodiments 12 hours to about 25 weeks, in embodiments about 12 hours to about 12 weeks, in embodiments about 12 hours to about 8 weeks, in embodiments about 12 hours to about 4 weeks, in embodiments about 12 hours to about 2 weeks, in embodiments about 24 hours to about 12 weeks, in embodiments about 24 hours to about 8 weeks, in embodiments about 24 hours to about 4 weeks, in embodiments about 24 hours to about 2 weeks, in embodiments about 24 hours to about 1 week, in embodiments about 48 hours to about 12 weeks, in embodiments about 48 hours to about 8 weeks, in embodiments about 48 hours to about 4 weeks, in embodiments about 48 hours to about 2 weeks, or in embodiments about 48 hours to about 1 week.

In embodiments of a cyclic steam stimulation method, a period of time between the injection of the steam and the recovery of the recovery material (i.e. the time between a discontinuation of the injection of the steam and an onset of the recovering of the recovery material) is from about one hour to about 4 weeks, in embodiments from about 1 hour to about 14 days, in embodiments about 1 hour to about 7 days, in embodiments about 12 hours to about 14 days, in embodiments about 12 hours to about 7 days, in embodiments about 1 day to about 4 weeks, in embodiments about 1 day to about 2 weeks, in embodiments about 1 day to about 7 days, in embodiments about 1 days to about 5 days, or in embodiments about 1 day to about 3 days. Such a period of time is sometimes called a "shut-in" period.

In cyclic steam stimulation, the recovery material, oil and/or a produced water, is collected for an extended period of time sometimes called a "production" period. The production period is typically governed by the productivity of the well, which declines as the formation cools. In embodiments, the production period is from about 1 week to about 4 years, in embodiments about 1 year to about 4 years, in embodiments about 1 week to about 3 years, in embodiments about 1 year to about 3 years, in embodiments about 1 week to about 2 years, in embodiments about 1 year to about 2 years, in embodiments about 5 weeks to about 52 weeks, in embodiments about 10 weeks to about 52 weeks, in embodiments about 10 weeks to about 30 weeks, in embodiments about 10 weeks to about 25 weeks, in embodiments about 10 weeks to about in embodiments about 1 week to about 52 weeks, in embodiments about 1 week to about 26 weeks, in embodiments about 1 week to about 12 weeks, in embodiments about 1 week to about 8 weeks, in embodiments about 1 week to about 6 weeks, in embodiments about 1 week to about 4 weeks, in embodiments about 1 week to about 3 weeks, in embodiments about 1 week to about 2 weeks, in embodiments about 2 weeks to about 8 weeks, or in embodiments about 2 weeks to about 4 weeks.

The recovery may be intermittent, that is discontinuous, sporadic, and/or episodic. The steam injection may be started and stopped. The method can include multiple cycles of injecting steam (not comprising an ether amine), injecting an vapor composition comprising the ether amine, a shut in period, and recovering in any order, with the proviso that the method includes at least one injection of the vapor composition comprising one or more ether amine compounds having a formula R—O—$(CH_2)_3$—$NH_2$, as described herein.

In embodiments, the produced water of the methods disclosed herein comprises calcium ions, magnesium ions, potassium ions, sodium ions, chloride ions, silica, silicate ions, sulfate ions, sulfide ions, or any combination thereof. In embodiments, the produced water in the recovery composition comprises silica, carbonate, bicarbonate, or any combination thereof.

In embodiments, the produced water of the recovery composition of the methods disclosed herein comprises about 0.5 ppm to about 55 ppm by weight of calcium ions, about 0.5 ppm to about 20 ppm magnesium ions, about 10 ppm to about 300 ppm potassium ions, about 100 ppm to about 5000 ppm sodium ions, about 5 ppm to about 500 ppm silica, about 5 ppm to about 500 ppm silicate ions, about 5 ppm to about 100 ppm ammonia and/or ammonium ions, about 30 ppm to about 7000 ppm chloride ions, about 50 ppm to about 1000 ppm carbonate ions, about 50 ppm to about 1000 ppm bicarbonate ions, about 100 ppm to about 700 ppm total organic carbon, or any combination thereof.

In embodiments, at least some of the vapor composition condenses in the subterranean formation to form a condensate. In embodiments, the subterranean formation comprises, consists of, or consists essentially of clay, sand, water, and heavy oil and/or bitumen.

In embodiments a condensate of the vapor composition comprises, consists of, or consists essentially of one or more ether amine compounds having a formula selected from the group consisting of $CH_3(CH_2)_3$—O—$(CH_2)_3$—$NH_2$, $CH_3(CH_2)_4$—O—$(CH_2)_3$—$NH_2$, $CH_3(CH_2)_5$—O—$(CH_2)_3$—$NH_2$, $CH_3(CH_2)_6$—O—$(CH_2)_3$—$NH_2$, $CH_3$—$(CH_2)_3$—CH$(C_2H_5)$—$CH_2$—O—$(CH_2)_3$—$NH_2$, $CH_3$—$(CH_2)_7$—O—$(CH_2)_3$—$NH_2$, $CH_3(CH_2)_8$—O—$(CH_2)_3$—$NH_2$, $(CH_3)$—$(CH_2)_9$—O—$(CH_2)_3$—$NH_2$, $(CH_3)_2CH$—$(CH_2)_7$—O—$(CH_2)_3$—$NH_2$, $CH_3(CH_2)_{11}$—O—$(CH_2)_3$—$NH_2$, $(CH_3)_2CH$—$(CH_2)_9$—O—$(CH_2)_3$—$NH_2$, $CH_3$—$(CH_2)_{12}$—O—$(CH_2)_3$—$NH_2$, $(CH_3)_2CH$—$(CH_2)_{10}$—O—$(CH_2)_3$—$NH_2$, and any combination thereof.

In embodiments a condensate of the vapor composition comprises, consists of, or consists essentially of water and one or more ether amine compounds having a formula selected from the group consisting of $CH_3(CH_2)_3$—O—$(CH_2)_3$—$NH_2$, $CH_3(CH_2)_4$—O—$(CH_2)_3$—$NH_2$, $CH_3(CH_2)_5$—O—$(CH_2)_3$—$NH_2$, $CH_3(CH_2)_6$—O—$(CH_2)_3$—$NH_2$, $CH_3$—$(CH_2)_3$—CH$(C_2H_5)$—$CH_2$—O—$(CH_2)_3$—$NH_2$, $CH_3$—$(CH_2)_7$—O—$(CH_2)_3$—$NH_2$, $CH_3(CH_2)_8$—O—$(CH_2)_3$—$NH_2$, $(CH_3)$—$(CH_2)_9$—O—$(CH_2)_3$—$NH_2$, $(CH_3)_2CH$—$(CH_2)_7$—O—$(CH_2)_3$—$NH_2$, $CH_3(CH_2)_{11}$—O—$(CH_2)_3$—$NH_2$, $(CH_3)_2CH$—$(CH_2)_9$—O—$(CH_2)_3$—$NH_2$, $CH_3$—$(CH_2)_{12}$—O—$(CH_2)_3$—$NH_2$, $(CH_3)_2CH$—$(CH_2)_{10}$—O—$(CH_2)_3$—$NH_2$, and any combination thereof.

In embodiments, at least a portion of the subterranean formation is at a temperature and pressure wherein the vapor composition condenses to form a wetting composition. The wetting composition comprises, consists of, or consists essentially of a condensate of the vapor composition. The wetting formulation could be a condensate of the vapor composition or it could be a combination of the condensate and other materials present in the subterranean formation. Such other materials can include water; aqueous solutions of dissolved salts; hydrocarbons; chemicals injected into the formation such as corrosion inhibitors, low molecular weight carboxylic acids such as acetic acid and/or heptanoic acid, naphthenic acids, asphaltenes, clay(s), and/or silica; and any combination thereof.

The vapor composition can condense within at least a portion of the subterranean oil reservoir. Without being bound by theory, we believe that ether amine in the formation lowers the interfacial tension between bitumen and water and/or brine in the formation. The lower interfacial tension increases bitumen mobility within the subterranean formation, thus improving recovery of the bitumen from the formation.

One measure of the interfacial tension between a liquid and bitumen is the contact angle of a drop of the liquid on bitumen, for example as measured by the Wilhelmy Plate Method. The lower the contact angle, the lower the interfacial tension between the liquid and the bitumen. The actual contact angle depends on whether it is measured advancing or receding and can be affected by whether it is measured on a first cycle or subsequent cycle (when the bitumen has already been contacted by the liquid and potentially been modified by it).

In embodiments, the advancing contact angle measured in a first cycle by the Wilhelmy Plate Method of a condensate of the vapor composition, the condensate consisting of 125 ppm of ether amine in water, is less than 105 degrees, in embodiments 50 degrees to 105 degrees, in embodiments 60 degrees to 100 degrees, in embodiments 70 degrees to 95 degrees, in embodiments 70 degrees to 90 degrees, or in embodiments 70 degrees to 80 degrees. In embodiments, the measurement is carried out at a temperature of about 20° C., in embodiments about 25° C., in embodiments about 30° C., in embodiments about 40° C., in embodiments about 60° C., or in embodiments about 80° C.

In embodiments, the receding contact angle measured in a first cycle by the Wilhelmy Plate Method of a condensate of the vapor composition, the condensate consisting of 125 ppm of ether amine in water, is less than 50 degrees, in embodiments 1 degree to 50 degrees, in embodiments 1 degree to 40 degrees, in embodiments 3 degrees to 40 degrees, in embodiments 1 degree to 30 degrees, in embodiments 5 degrees to 30 degrees, in embodiments 5 degrees to 20 degrees, or in embodiments 5 degrees to 10 degrees.

Interfacial tension can be measured by drop-shape, drop-volume, or spinning-drop tensiometer. If the interfacial tension between deionized water and bitumen is IFTw and the interfacial tension between condensate (the condensate consisting of water and ether amine) and bitumen is IFTc, then percent reduction in interfacial tension (%IFTr) due to the ether amine is given by:

%IFTr=(IFTw−IFTc)×(100/IFTw).

In embodiments, the percent interfacial reduction (%IFTr) at 20° C. after one hour and at a pH of 6.5 to 7.5 (i.e. the condensate has or is adjusted to have a pH of 6.5 to 7.5), wherein the condensate consists of water and ether amine and the ether amine is present at a concentration of 1000 ppm in the condensate, is 40% to 80%, in embodiments 45% to 75%, or in embodiments 50% to 70%.

In embodiments, the percent interfacial reduction (%IFTr) at 20° C. and a pH of 6.5 to 7.5 (i.e. the condensate is has or is adjusted to have a pH of 6.5 to 7.5) after one hour, wherein the condensate consists of water and ether amine and the ether amine is present at a concentration of 250 ppm in the condensate, is 40% to 80%, in embodiments 45% to 75%, or in embodiments 50% to 70%.

In embodiments, the percent interfacial reduction (%IFTr) at 80° C. and a pH of 6.5 to 7.5 (i.e. the condensate is has or is adjusted to have a pH of 6.5 to 7.5) after one hour, wherein the condensate consists of water and ether amine and the ether amine is present at a concentration of 250 ppm in the condensate, is 40% to 80%, in embodiments 45% to 75%, or in embodiments 50% to 70%.

In embodiments, there is provided the vapor composition of any of the methods described herein.

In embodiments, there is provided a composition comprising, consisting of, or consisting essentially of a crude oil, water, and one or more ether amines having the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl. In embodiments, the one or more ether amine compounds comprises, consists of, or consists essentially of 3-(n-butoxy)-1-aminopropane (3-(n-butoxy)propylamine), 3-(2-ethylhexoxy)-1-aminopropane (3-(2-ethylhexoxy)propylamine), 3-(isodecoxy)-1-aminopropane (3-(isodecoxy)propylamine), or any combination thereof.

As set forth herein, heavy oil and/or bitumen may be obtained by steam-assisted oil recovery methods such as SAGD and cyclic steam stimulation. However, bitumen may also be obtained from surface mining techniques. In some such techniques, after removing any muskeg and overburden layers and dewatering the oil sands layer, a bituminous ore is removed from the oil sands layer by excavating from an open cut therein. The ore is then processed in an ore preparation plant. Clumps of oil sands ore are crushed, and the oil sands are combined with hot or warm water, e.g. at 70° C. to 90° C., to produce an aerated oil sands slurry. Optionally, the hot or warm water contains an alkali such as caustic soda to raise the pH of the slurry to, for example, about 9. The higher pH can aid in bitumen recovery from the slurry. Various equipment can be used in the preparation of the slurry, such as a tumblers, cyclofeeders, mix boxes, rotary breakers, and wet crushers. Regardless of the slurry preparation equipment, a target density for the slurry is about 1500 to 1580 kg/m$^3$. Oversized material may be removed from the slurry.

The oil sands slurry is then processed in an extraction process. The slurry can be pumped to an extraction plant In combination with water but absent a steam evaporation step, the ether amine additives described herein also exhibit very low interfacial tensions such as 8.6 to 9.0 dynes/cm for a water/3-(isodecoxy)-1-aminopropane mixture at only 250 ppm of the ether amine additive.

Accordingly, there is provided a method comprising, consisting of, or consisting essentially of combining an ether amine additive and water to form a first water-additive mixture; and washing and/or combining a bituminous ore with the water-additive mixture. In embodiments, the bituminous ore comprises sandstone and bitumen. In embodiments, the method further comprises separating bitumen from the bituminous ore.

The water-additive mixture comprises, consists of, or consists essentially of water and one or more ether amine compounds. In embodiments, the water-additive mixture comprises, consists of, or consists essentially of water, the one or more ether amine compounds, and sodium hydroxide.

In embodiments, the one or more ether amine compounds has the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

In embodiments, the one or more ether amine compounds comprises consists of, or consists essentially of 3-(n-butyl)-1-aminopropane, 3-(2-ethylhexyl)-1-aminopropane, 3-(isodecoxy)-1-aminopropane, or any combination thereof. In embodiments, combining the bituminous ore and the water-additive mixture comprises, consists of, or consists essentially of washing the bituminous ore with the water-additive mixture.

In embodiments, combining the bituminous ore and the water-additive mixture forms a pumpable slurry having a density of 1500 to 1580 kg/m$^3$.

Further Description of Embodiments

Embodiment 1. A method of steam-assisted oil recovery, the method comprising: injecting a vapor composition into a subterranean oil reservoir, the vapor composition comprising one or more ether amine compounds having the formula R—O—$(CH_2)_3$—$NH_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl; and recovering a recovery material, the recovery material comprising heavy crude oil, bitumen, or a combination thereof.

Embodiment 2. Embodiment 1, wherein the one or more ether amine compounds comprises, consists of, or consists essentially of 3-(n-butyl)-1-aminopropane, 3-(2-ethylhexyl)-1-aminopropane, 3-(isodecyl)-1-aminopropane, or any combination thereof.

Embodiment 3. Embodiment 1 or Embodiment 2, further wherein the vapor composition comprises, consists of, or consists essentially of steam and the one or more ether amine compounds.

Embodiment 4. Any one of Embodiments 1-3, wherein the concentration of the one or more ether amine compounds in the vapor composition is 100 to 300 parts per million by weight.

Embodiment 5. Any one of Embodiments 1-4, wherein a temperature of the vapor composition is 160° C. to about 375° C.

Embodiment 6. Any one of Embodiments 1-5, wherein a pressure of the vapor composition is about 90 psi to about 3,060 psi.

Embodiment 7. Any one of Embodiments 1-6, wherein the vapor composition is at a temperature of 250° C. to 270° C.

Embodiment 8. Any one of Embodiments 1-7, wherein the vapor composition is at a pressure of about 577 psi to about 799 psi.

Embodiment 9. Any one of Embodiments 1-7, wherein the subterranean oil reservoir is an oil sands reservoir.

Embodiment 10. Any one of Embodiments 1-9, wherein the method is a steam-assisted gravity drainage method or a cyclic steam stimulation method.

Embodiment 11. Any one of Embodiments 1-10, wherein the vapor composition is injected via a first wellbore and wherein a temperature of the reservoir proximal to the first wellbore is about 200° C. to about 375° C.

Embodiment 12. Any one of Embodiments 1-11, wherein the method further comprising injecting steam into the subterranean oil reservoir, wherein the steam does not comprise an ether amine.

Embodiment 13: The method of any one of embodiments 1-12, wherein the method comprises adding the one or more ether amine compounds to steam to form the vapor composition.

Embodiment 14: The method of any one of embodiments 1-12, wherein the method further comprises combining the one or more ether amine compounds with water to form a water-additive mixture, and heating the water-additive mixture to form the vapor composition.

Embodiment 15: The method of Embodiment 14, wherein the concentration of the one or more ether amine compounds in the water-additive mixture is 50 ppm to 1000 ppm by weight.

Embodiment 16: The method of Embodiment 14 or Embodiment 15, wherein the concentration of the one or more ether amine compounds in the water-additive mixture is 100 ppm to 500 ppm by weight.

Embodiment 17: The method of any one of Embodiments 14-16, wherein the concentration of the one or more ether amines in the water-additive mixture is 100 ppm to 300 ppm by weight.

Embodiment 18: The method of any one of Embodiments 14-17, wherein the concentration of the one or more ether amines in the water-additive mixture is 125 ppm to 250 ppm by weight.

Embodiment 19. A use of one or more ether amine compounds as an additive to steam in a steam-assisted recovery of bitumen, heavy crude oil, or a combination thereof from a subterranean oil reservoir, wherein each of the one or more ether amine compounds has the formula R—O—(CH$_2$)$_3$NH$_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

Embodiment 20: A use of one or more ether amine compounds as an additive to steam in a steam-assisted recovery of bitumen, heavy crude oil, or a combination thereof from a subterranean oil reservoir, wherein the one or more ether amine compounds comprises, consists of, or consists essentially of 3-(n-butyl)-1-aminopropane, 3-(2-ethylhexyl)-1-aminopropane, 3-(isodecyl)-1-aminopropane, or any combination thereof.

Embodiment 21: A vapor composition comprising, consisting of, or consisting essentially of steam and one or more ether amines having the formula R—O—(CH$_2$)$_3$NH$_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

Embodiment 22: A vapor composition comprising, consisting of, or consisting essentially of steam and an ether amine selected from the group consisting of 3-(n-butyl)-1-aminopropane, 3 -(2-ethylhexyl)-1-aminopropane, 3-(isodecyl)-1-aminopropane, or any combination thereof.

Embodiment 23: A composition comprising, consisting of, or consisting essentially of a crude oil, water, and one or more ether amines having the formula R—O—(CH$_2$)$_3$NH$_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

Embodiment 24: The composition of Embodiment 23, wherein the one or more ether amines is selected from the group consisting of 3-(n-butyl)-1-aminopropane, 3-(2-ethylhexyl)-1-aminopropane, 3-(isodecyl)-1-aminopropane, or any combination thereof.

Embodiment 25: A method comprising, consisting of, or consisting essentially of combining one or more ether amine compounds with water to form a water-additive mixture; and combining a bituminous ore with the water-additive mixture.

Embodiment 26: The method of Embodiment 25, wherein the bituminous ore comprises, consists of, or consists essentially of sandstone and bitumen.

Embodiment 27: The method of Embodiment 25 or Embodiment 26, wherein the water-additive mixture comprises, consists of, or consists essentially of the one or more ether amine compounds, water, and sodium hydroxide.

Embodiment 28: The method of any one of Embodiments 25-27, the method further comprising separating bitumen from the bituminous ore.

Embodiment 29: The method of any one of Embodiments 25-28, wherein the one or more ether amine compounds has the formula R—O—(CH$_2$)$_3$NH$_2$, wherein R is selected from the group consisting of n-butyl, n-pentyl, n-hexyl, n-heptyl, 2-ethylhexyl, n-octyl, n-nonyl, n-decyl, isodecyl, n-dodecyl, isododecyl, n-tridecyl, and isotridecyl.

Embodiment 30: The method of any one of Embodiments 25-29, wherein the one or more ether amines is selected from the group consisting of 3-(n-butoxy)-1-aminopropane, 3-(2-ethylhexoxy)-1-aminopropane, 3-(isodecoxy)-1-aminopropane, or any combination thereof.

Embodiment 31: The method of any one of Embodiments 25-30, wherein the water-additive mixture has a temperature of 70° C. to 90° C.

Embodiment 32: The method of any one of Embodiments 25-31, wherein the combining the bituminous ore with the water-additive mixture comprises, consists of, or consists essentially of washing the bituminous ore with the water-additive mixture.

Embodiment 33: The method of any one of Embodiments 25-32, wherein the combining the bituminous ore with the water-additive mixture forms a pumpable slurry.

Embodiment 34: The method of Embodiment 33, wherein the slurry has a density of 1500 to 1580 kg/m$^3$.

Embodiment 35: The method of any one of Embodiments 25-35, wherein the one or more ether amine compounds comprises, consists of, or consists essentially of 3-(iso-decoxy)-1-aminopropane.

EXAMPLES

Example 1

Preparation of Condensates

A Parr reactor was connected to a condensing column and a fluid-collection reservoir. 60-80 mL of a mixture of a test compound and deionized water were disposed in the pressure vessel. The aqueous test compound was heated in the closed Parr reactor to a temperature of 260° C. and maintained at a temperature of 250-270° C. Then a valve was slowly opened to allow vapor to pass into the condensing column, where a mixture of water and test compound condensed and was collected in the reservoir as a condensate.

The experiment was performed with each of the test compounds listed in TABLE 1 to obtain condensate comprising the test compound. The condensate samples were tested for interfacial tension and contact angle with bitumen as described in Examples 2 and 3 respectively herein below.

Example 2

Interfacial Tension Measurements on the Condensates

Dynamic interfacial tension (IFT) was measured from the shape of a diluted bitumen droplet immersed in the condensate using a Teclis Tracker drop-shape tensiometer. The bitumen droplet comprised 37.5% of toluene and 62.5% bitumen by volume. Before measurement, the pH of each sample of condensate was adjusted with dilute hydrochloric acid to pH 6.5-7.5.

The percent decrease in interfacial tension (% IFT reduction) of each condensate with the diluted bitumen as compared with deionized water with the diluted bitumen was calculated using the equation % IFT reduction=$(IFT_{DI} - IFT_{COND}) \times 100 / IFT_{DI}$, where $IFT_{DI}$ was the interfacial tension of deionized water with the diluted bitumen and $IFT_{COND}$ was the interfacial tension of the condensate with the diluted bitumen. The results are given in TABLE 1.

TABLE 1

Interfacial tension reduction of condensates at one hour

| Test | Test compound | Concentration of test compound in aqueous mixture before vaporization (ppm) | Temperature of IFT measurement (° C.) | % IFT reduction after one hour |
|---|---|---|---|---|
| A | propylene glycol butyl ether | 1000 | 20 | 8 |
| B | 3-(2-ethylhexoxy)propylamine | 125 | 20 | 47 |
| C | 3-(2-ethylhexoxy)propylamine | 250 | 20 | 50 |
| D | 3-(n-butoxy)propylamine | 1000 | 20 | 58 |
| E | 3-(isodecoxy)propylamine | 125 | 20 | 54 |
| F | urea | 1000 | 20 | 37 |
| G | aniline | 1000 | 20 | 24 |
| H | pyridine | 1000 | 20 | 5 |
| I | 3,5-dimethyl-1-hexyn-3-ol | 1000 | 20 | 12 |
| J | 3,6-dimethyl-4-octyne-3,6-diol | 1000 | 20 | 10 |
| K | 2,4,7,9-tetramethyl-5-decyne-4,7-diol | 1000 | 20 | 9 |
| L | ethoxylated 2,4,7,9-tetramethyl-5-decyne-4,7-diol | 1000 | 20 | 24 |
| M | ethoxylated butanol | 1000 | 20 | 5 |
| N | 3-(2-ethylhexoxy)propylamine | 250 | 80 | 55 |
| O | 3-(2-ethylhexoxy)propylamine | 125 | 80 | 31 |
| P | 3-(isodecoxy)propylamine | 125 | 80 | 71 |
| Q | 3-(isodecoxy)propylamine | 250 | 80 | 73 |

TABLE 2

Effect of time on IFT reduction of condensates at 20° C.

| Test | Test Compound | Concentration of test compound in aqueous mixture before vaporization (ppm) | % IFT reduction at 0 hour | % IFT reduction at 0.5 hour | % IFT reduction at 1 hour |
|---|---|---|---|---|---|
| R | 3-(isodecoxy)propylamine | 250 | 49 | 58 | 59 |
| S | 3-methoxypropylamine (MOPA) | 250 | 24 | 30 | 43 |
| T | 2-(2-methoxyethoxy)-1-aminoethane | 250 | 20 | 24 | 25 |

The results in TABLE 2 show that condensate comprising 3-(isodecoxy)propylamine outperformed both the condensate containing 3-methoxypropylamine and the condensate containing 2-2-methoxyethoxy-1-aminoethane, viz. the % interfacial tension (IFT) reduction at 0 hours, 0.5 hours, and 1 hour was greater.

Results of IFT reduction at one hour for ether amine test compounds are collected together in TABLE 3 and plotted in the FIGURE.

TABLE 3

Interfacial tension reduction of condensates at one hour

| Test | Test compound | Concentration of test compound in aqueous mixture before vaporization (ppm) | Temperature/° C. | % IFT reduction at 1 hour |
|---|---|---|---|---|
| B | 3-(2-ethylhexoxy)propylamine | 125 | 20 | 47 |
| C | 3-(2-ethylhexoxy)propylamine | 250 | 20 | 50 |
| O | 3-(2-ethylhexoxy)propylamine | 125 | 80 | 31 |
| N | 3-(2-ethylhexoxy)propylamine | 250 | 80 | 55 |
| D | 3-(n-butoxy)propylamine | 1000 | 20 | 58 |
| E | 3-(isodecoxy)propylamine | 125 | 20 | 54 |
| R | 3-(isodecoxy)propylamine | 250 | 20 | 59 |
| P | 3-(isodecoxy)propylamine | 125 | 80 | 71 |
| Q | 3-(isodecoxy)propylamine | 250 | 80 | 73 |
| S | 3- methoxypropylamine | 250 | 20 | 43 |
| T | 2-(2-methoxyethoxy)-1-aminoethane | 250 | 20 | 25 |

As can be seen in the FIGURE, 3-(isodecoxy)propylamine, 3-(2-ethylhexoxy)propylamine, and 3-(n-butoxy)propylamine with the exception of 3-(2-ethylhexoxy)propylamine at 125 ppm and 80° C. outperformed 3-methoxypropylamine and 2-(2-methoxyethoxy)-1-aminoethane with regard to % interfacial tension reduction. 3-(isodecoxy)propylamine and 3-(2-ethylhexoxy)propylamine outperformed 3-methoxypropylamine and 2-(2-methoxyethoxy)-1-aminoethane at a comparable starting concentration of the compound, 250 ppm, in the aqueous mixture before vaporization.

Example 3

Contact Angles of Condensates on Bitumen-Coated Glass

Each of three clean glass slides was coated with 30 parts of bitumen in 18 parts of toluene and the toluene allowed to evaporate at room temperature to provide a coating of bitumen on the slide. For each of three test liquids, the advancing and receding contact angles of a test liquid were measured twice (two cycles) on the bitumen surface on each slide. The measurements were conducted by the Wilhelmy Plate Method using a Kruss K-12 tensiometer.

The three test liquids were deionized water, a condensate of 125 ppm by weight aqueous 3-(isodecoxy)propylamine, and a condensate of 1000 ppm by weight aqueous solution of urea. Results are provided in TABLE 4:

TABLE 4

Advancing and receding contact angles

| | | Measured contact angle (°) | | |
|---|---|---|---|---|
| | Cycle | Deionized water | 125 ppm aqueous 3-(isodecoxy)propylamine | 1000 ppm urea |
| Advancing | 1 | 113.6 | 84.5 | 111.6 |
| | 2 | 108.5 | 83.8 | 108.5 |

TABLE 4-continued

Advancing and receding contact angles

| | | Measured contact angle (°) | | |
|---|---|---|---|---|
| | Cycle | Deionized water | 125 ppm aqueous 3-(isodecoxy)propylamine | 1000 ppm urea |
| Receding | 1 | 55.9 | 6.2 | 57.1 |
| | 2 | 55.7 | 1.0 | 59.2 |

Example 4

Interfacial Tensions of Water-Additive Mixtures

Three aqueous mixtures were made up having the formulations shown in TABLE 5. The first two were mixtures of deionized water and 3-(isodecoxy)propylamine; and the third was a mixture of deionized water and propylene glycol n-butyl ether (major isomer $C_4H_9OCH_2CH(CH_3)OH$).

The dynamic interfacial tension of each of the water-additive mixtures was measured against bitumen as described in Example 2 and the percent interfacial tension reduction calculated as in Example 2. Results are given in TABLE 5. The interfacial tension of deionized water was also run. The pH of both mixtures and the deionized water was pH 7 when the measurements were run.

TABLE 5

Interfacial tensions at pH 7 of water-additive mixtures and water against bitumen/toluene, measured at 19° C. to 20° C.

| Test | Test compound | Concentration of test compound in aqueous mixture (ppm) | IFT (dyne/cm) 0.5 hours | IFT (dyne/cm) 1 hour | % IFT reduction at 0.5 hours | % IFT reduction at 1 hour |
|---|---|---|---|---|---|---|
| U | 3-(isodecoxy) propylamine | 125 | 12.8 | 12.2 | 47% | 49% |
| V | 3-(isodecoxy) propylamine | 250 | 9.0 | 8.6 | 63% | 64% |
| W | propylene glycol butyl ether | 1000 | 13.0 | 12.9 | 46% | 46% |
| X | deionized water | — | 24.3 | 24.0 | — | — |

The 3-(isodecoxy)propylamine mixture with water exhibited a much lower interfacial tension than the propylene glycol butyl ether mixture with water at 25% the dosage.

What we claim is:

1. A method of steam-assisted oil recovery, the method comprising:
  (1) injecting a vapor composition into a subterranean oil reservoir, the vapor composition comprising one or more ether amine compounds selected from the group consisting of 3-(n-butoxy)-1-aminopropane, 3-(n-pentoxy)-1-aminopropane, 3-(n-hexoxy)-1-aminopropane, 3-(n-heptoxy)-1-aminopropane, 3-(2-ethylhexoxy)-1-aminopropane, 3-(n-octoxy)-1-aminopropane, 3-(n-nonoxy)-1-aminopropane, 3-(n-decoxy)-1-aminopropane, 3-(isodecoxy)-1-aminopropane, 3-(n-dodecoxy)-1-aminopropane, 3-(isododecoxy)-1-aminopropane, 3-(n-tridecoxy)-1-aminopropane, 3-(isotridecoxy)-1-aminopropane, and any combination thereof; and
  (2) recovering a recovery material comprising heavy crude oil, bitumen, or a combination thereof.

2. The method of claim 1, wherein the one or more ether amine compounds comprises 3-(n-butoxy)-1-aminopropane, 3-(2-ethylhexoxy)-1-aminopropane, 3-(isodecoxy)-1-aminopropane, or any combination thereof.

3. The method of claim 1, wherein the one or more ether amine compounds consists essentially of 3-(n-butoxy)-1-aminopropane, 3-(2-ethylhexoxy)-1-aminopropane, 3-(isodecoxy)-1-aminopropane, or any combination thereof.

4. The method of claim 3, wherein a concentration of the one or more ether amine compounds in the vapor composition is 100 to 300 parts per million by weight.

5. The method of claim 1, wherein the vapor composition consists essentially of steam and the one or more ether amine compounds.

6. The method of claim 1, wherein a temperature of the vapor composition is 160° C. to 375° C.

7. The method of claim 1, wherein a pressure of the vapor composition is 90 psi to 3,060 psi during the injecting.

8. The method of claim 1, wherein the vapor composition is at a temperature of 250° C. to 270° C.

9. The method of claim 1, wherein the vapor composition is at a pressure of 577 psi to 799 psi during the injecting.

10. The method of claim 1, wherein the subterranean oil reservoir is an oil sands reservoir.

11. The method of claim 1, wherein the recovery material further comprises a produced water.

12. The method claim 1, wherein the method is a steam-assisted gravity drainage method or a cyclic steam stimulation method.

13. The method of claim 1, wherein the vapor composition is injected via a first wellbore and the recovery material is recovered via the first wellbore or a second wellbore.

14. The method of claim 1, wherein the vapor composition is injected via a first wellbore, and wherein a temperature of the reservoir proximal to the first wellbore is about 200° C. to about 375° C.

15. The method of claim 1, the method further comprising in a step separate from the injecting the vapor composition: (3) injecting steam into the subterranean oil reservoir, wherein the steam does not comprise an ether amine.

16. The method of claim 1, wherein the one or more ether amine compounds consists essentially of 3-(isodecoxy)-1-aminopropane.

* * * * *